Patented Oct. 15, 1940

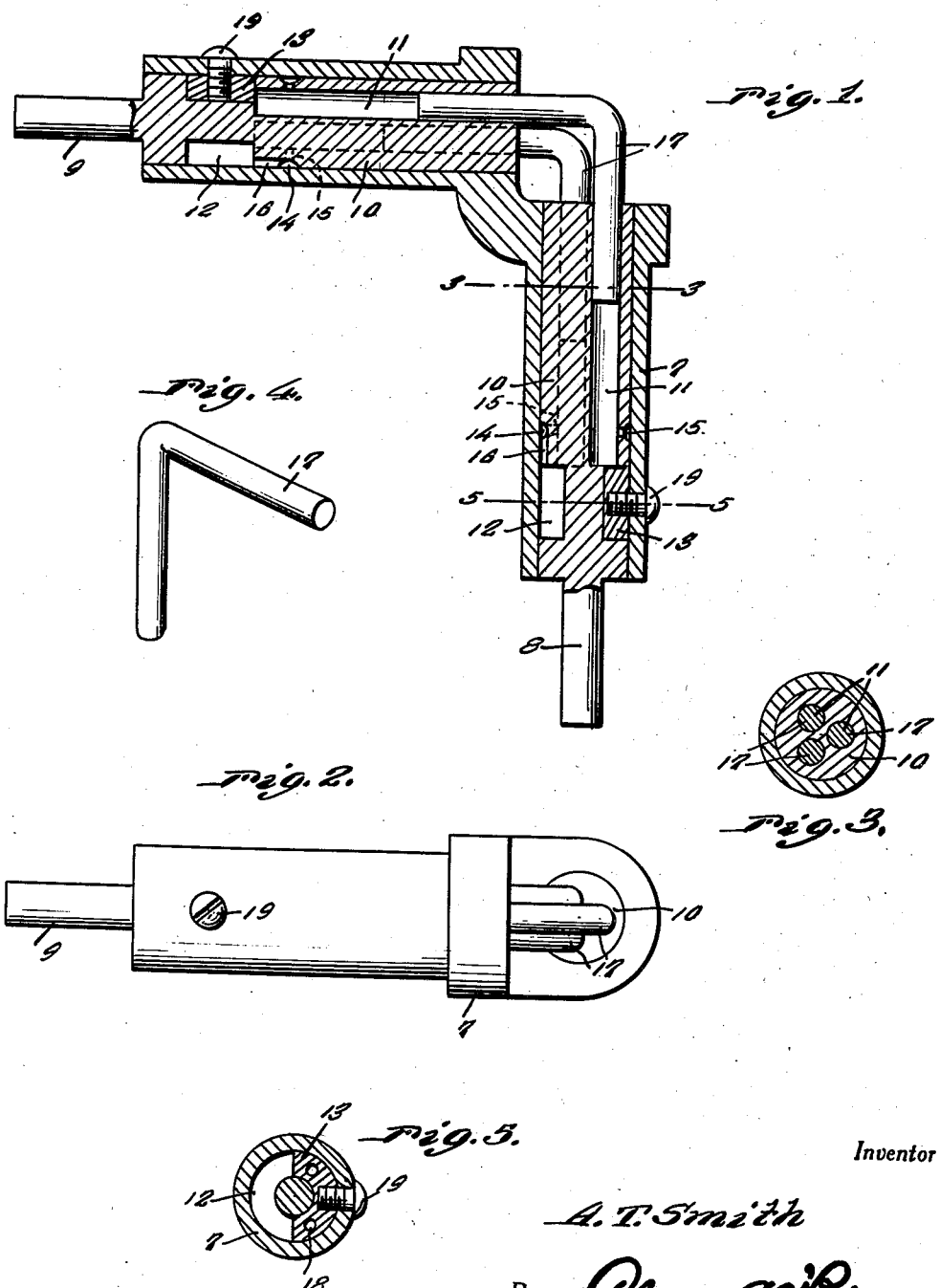

2,218,303

UNITED STATES PATENT OFFICE 2,218,303

ANGLE SHAFT COUPLING

Albert T. Smith, Redwood City, Calif.

Application June 21, 1939, Serial No. 280,423

1 Claim. (Cl. 64—20)

The present invention relates to that class of mechanism by which motion is transmitted from one to the other of two shafts placed at an angle to each other, and has for its primary object to provide, in a manner as hereinafter set forth, a device of this character embodying a novel construction, combination and arrangement of parts through the medium of which motion may be transmitted with a maximum of efficiency.

Other objects of the invention are to provide a mechanism of the aforementioned character which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a plan view of my invention shown partly in transverse section.

Figure 2 is an end elevational view of the invention.

Figure 3 is a transverse sectional view taken substantially on the line 3—3 of Fig. 1.

Figure 4 is a perspective view of one of the angle rods, and

Figure 5 is a transverse sectional view taken substantially on the line 5—5 of Fig. 1.

Referring now to the drawing in detail it will be seen that the reference numeral 7 designates an L-shaped shaft housing, constructed of metal or other suitable material, into which is rotatably mounted the shafts 8 and 9. Each of the shafts 8 and 9 has formed at one end portion thereof an enlarged head 10 each of which has formed therein a series of axial bores 11. Within the head portions 10 and adjacent the inner ends of the bores 11 there are grooves 12 for receiving anchoring blocks 13. Other grooves 14 are formed around the heads 10 and communicate with the bores 11 and grooves 12 through ducts 15 and 16.

A series of L-shaped rods 17 are slidably engageable in the bores 11 as best shown in Figure 1 of the drawing.

The anchoring blocks 13 have small bores 18 therethrough for communicating with the bores 11 in the heads 10, and are fixed to the L-shaped shaft housing through the medium of screws 19 as shown in Figure 1 of the drawing.

The operation of the device is believed to be manifest, but may be briefly described as follows:

When the shaft 8 is rotated in the housing 7 the L-shaped bars 17 transmit said motion to shaft 9. The grooves 14 and ducts 15 and 16 are provided to prevent partial vacuum and compression in the bores 11 when the L-shaped rods 17 reciprocate therein. Also the bores and ducts provide passage for a lubricant.

The most important feature of this drive is the complete elimination of thrust both lateral and radial. Thrust in each shaft driving and driven is constantly cancelled out by driving pins moving in opposite direction.

This drive is especially adapted to right angle speedometer and tachometer use taking place of the conventional gear drive with the inherent thrust in that type of drive.

While I have referred to this as a right angle drive it can be built and will operate equally successfully at any angle up to and including 90 degrees.

Although I have shown and described herein a preferred embodiment of my invention, it is to be definitely understood that I do not desire to limit the application of the invention thereto, and any change or changes may be made in the materials and in the structure and arrangement of parts, within the spirit of the invention as claimed.

What is claimed is:

The combination of two rotary shafts adapted to rotate about axes intersecting at an angle, each of said rotary shafts including an enlarged head portion, each enlarged head portion having annular grooves and further having longitudinal bores communicating with said grooves to provide a passage for a lubricant, L-shaped rods having their end portions mounted in said bores for transmitting rotary motion from one of said shafts to the other, an L-shaped housing for said shafts, semi-circular blocks in said housing engaged in certain of said grooves and anchoring means for securing said semi-circular blocks in said L-shaped housing to prevent longitudinal movement of said shafts therein.

ALBERT T. SMITH.